Patented Dec. 18, 1951

2,578,816

UNITED STATES PATENT OFFICE 2,578,816

GLYCERIN REFINING

Lyle J. Lofdahl, Omaha, Nebr., and James K. Gunther, Galesburg, Ill., assignors to Swift & Company, Chicago, Ill., a corporation of Illinois No Drawing. Application March 7, 1949, Serial No. 80,106

8 Claims. (Cl. 260—637)

This invention relates to the refining and deodorization of glycerin, and more particularly, it relates to the removal of odor-forming impurities from distilled glycerin produced as a by-product in the manufacture of soap or derived from the distillation of saponification crude glycerin obtained from the manufacture of fatty acids to render the same suitable for use in food products, beverages, cosmetics, and the like.

The conventional method of preparing "pure" glycerin from a crude product is to subject the crude to distillation with open steam blowing in the presence of a small amount of free alkali in the still charge. The vapors are fractionally condensed, producing a concentrated glycerin of 98–100% in the first of several condensers. This material, after bleaching with activated carbon to a water-white color, is the usual "chemically pure" material that will meet U. S. P. requirements when concentration is adjusted and if the procedure of distillation has been properly carried out.

When the crude product is obtained from the spent lyes of a soap-making process, certain types of impurities, such as dissolved soap, albuminous material, and the like, are more or less completely removed by precipitation as the salts of heavy metals which may be filtered out prior to the evaporation of the spent lyes to a crude glycerin solution of about 80% concentration.

The soap lye crude glycerin, treated as above, is then charged into a still, heated to a temperature above 300° F. at a reduced pressure, steam blown, and the glycerin removed therefrom by means of partial pressure distillation. The soap lye crude glycerin as charged into the still contains some nonvolatile organic material as impurities, this material consisting for the most part of sodium salts of various fatty acids and other types of organic acids. Due to the presence of these organic, non-volatile impurities, it is necessary to use a fairly high percentage of free caustic soda or other alkali in the still pot so as to prevent, insofar as possible, the splitting and distillation of these fatty materials either as the acids themselves or as esters of glycerin or other alcohols. Even with this precaution, small amounts ranging from one to two milliequivalents of these impurities are generally distilled over with the glycerin and are condensed along with the so-called C. P. glycerin.

The requirements of the U. S. P. and of most purchasers of the C. P. grade of glycerin, are that the odor shall be slight, characteristic and neither harsh nor disagreeable, and that the color thereof be water white.

The product obtained by the methods of the prior art as a result of the double distillation and decoloration discussed above, may meet the standards for C. P. glycerin both as to the water-white color and the lack of odor when freshly prepared. However, it has been observed and recognized by the prior art that when the ordinary C. P. glycerin is used under conditions wherein the pH of the glycerin solution is low, certain objectionable odors may develop even though the glycerin was water white and practically odorless when freshly prepared.

It is believed that the odor-forming impurities which cause an objectionable odor to develop in glycerin upon acidulation thereof are derived in part from the aforementioned organic materials which are distilled over with the glycerin despite the precautions of maintaining excess free caustic in the still and maintaining careful control of the temperature ranges of the fractions distilled off. A further source of the odor-forming impurities which manifest their presence in glycerin when the said glycerin is acidulated, may be various decomposition products of the glycerin itself, said products being formed during the distillation of the glycerin. These decomposition products, which may be acid, would also form esters with the glycerin and would not be removed during a normal deodorization of the distilled glycerin with steam under relatively high temperatures and low pressures.

It has now been found that glycerin, which has been subjected to the usual distillation and decoloration with activated carbon but which still develops an objectionable odor when acidulated for use in food products, beverages, coatings for food products, cosmetics, toilet articles, or the like, may be further treated and purified to make it acceptable for such uses.

Therefore, it is an object of this invention to produce practically colorless and odorless glycerin substantially free from odor-forming impurities.

It is a further object of this invention to produce glycerin which will remain substantially colorless and odorless under any range of pH conditions.

Other objects and advantages, if not specifically pointed out, will be apparent to one skilled in the art from the following detailed description of this invention.

In general these objects are attained by the deodorization of so-called C. P. glycerin conventionally prepared as a by-product of soap manufacture or other saponification process under acid conditions with a volatile acid to decompose certain odor-forming bodies present therein.

In the preferred form of the invention, the conventionally prepared glycerin is treated with a small amount of hydrochloric acid either before or during steam deodorization of the glycerin under vacuum and the deodorization continued for a sufficient length of time to effect removal of odor-forming impurities present therein. The steam deodorizing step is performed under acid conditions as indicated above in order to split esters produced upon the decomposition of glycerin during the previous distillation thereof. Activated carbon may be added during the steam deodorization in order to insure retention of the desirable water-white color of the resulting product. After a sufficient length of time, which may be around two hours, the temperature of the acidulated glycerin mixture is raised to around 164° C. to remove the last traces of hydrochloric acid present. The exact temperature and pressure conditions of the deodorization step may vary considerably. However, it has been found that under a pressure of 10 millimeters mercury (absolute), a temperature of about 93° C. gives satisfactory results, while under a pressure of 5 millimeters mercury (absolute), a temperature of around 65° C. would give good results. Likewise, the time required for steam deodorization will vary with the temperature and pressure. However, it has been found that three hours' steam deodorization is approximately the minimum time required for the complete removal of the volatile acids. The acid used in the deodorization step to acidify the glycerin is preferably HCl, but any other similar volatile acid may be used. The acid is used in small amounts, preferably below 0.5% by weight.

Although the foregoing has been chiefly related to glycerin derived as a by-product of soap manufacture, glycerin obtained from the distillation of saponification crude resulting from fatty acid manufacture is also considered within the scope of this invention. Obviously, glycerin obtained from other saponification processes is also capable of being successfully treated by the method of this invention.

It is believed that the present invention may be more fully understood from the following specific examples which are set forth for the purpose of illustration rather than limitation.

Example I

To 100 parts of distilled glycerin (99–100% glycerin) at a temperature of approximately 38° C. or higher, were added 0.1 to 0.2 parts HCl (100% basis) and 10.0 parts distilled water. The mixture was then heated at a pressure of 10 millimeters mercury (absolute) to approximately 93° C. and held at this temperature with steam blowing through the liquid for a period of two hours. At this point 0.1% to 1.0% activated carbon was added and blowing under vacuum at 93° C. was continued for one hour longer. The contents of the vessel were then filtered and a water-white glycerin was produced which was practically odor free both when used in a neutral solution and when acidulated.

Example II

To 700 grams of C. P. glycerin were added 70 grams of distilled water and 5 grams of concentrated hydrochloric acid (approximately 0.2% HCl). The cold mixture was placed in a laboratory deodorizer and heated until the temperature of the mixture indicated that the excess water had been driven off. Vaporized HCl was then fed into the glycerin with the steam and this was continued for two more hours, at the end of which time the HCl was discontinued and steam deodorization alone continued for another hour. A short time before the deodorization was completed, the temperature of the mixture was held at above 130° C. and finally raised to 164° C. in an effort to remove the last traces of chlorine which might be left in the glycerin. The resulting product was practically odor free both when used in a neutral solution and when acidulated.

Example III 700 grams of C. P. glycerin were treated with 70 grams of distilled water and 9 grams of concentrated hydrochloric acid (0.4% HCl). The mixture was held at room temperature for 24 hours and then deodorized as in Example II for a period of 4 hours at 5 mm. mercury pressure (absolute), without, however, any HCl vapor being passed into the mixture. The resulting product was similar in its organoleptic properties to that of Example II.

Example IV 700 grams of C. P. glycerin were treated with 35 grams of distilled water and 2 grams of concentrated hydrochloric acid (0.1% HCl). The mixture was then heated to about 71° C. and then cooled in an ice bath to 29° to 32° C. This mixture was then placed in a laboratory deodorizer and steam deodorized. The flask was held at approximately 80° to 85° C. by a water bath. The mixture was maintained at a temperature below 65° C. for two hours. At the end of the first hour, 2 grams of concentrated hydrochloric acid and 35 grams of distilled water were added to the glycerin mixture to replenish the acid lost in the deodorization. At the end of the two hours, the temperature of the mixture was increased to above 120° C. for 10 to 15 minutes and then increased to 164° C. to remove the last traces of hydrochloric acid. To this mixture, after cooling, was added 2% bleaching carbon and the steam vacuum deodorization was continued, holding the water bath surrounding the flask at 85° to 90° C. so that the product was taken off at about 65° C. After two hours of this treatment, the sample was filtered. The odor of this sample was slightly better than that of the samples prepared in the previous examples both when used in neutral and in acid solution.

In order to obtain comparative tests of this method, control samples were taken from each sample of C. P. glycerin used in the above examples prior to treatment thereof. At the conclusion of the steam deodorization under vacuum in the presence of a volatile acid, a sample of the treated deodorized glycerin and a sample of the control, i. e., untreated C. P. glycerin, were each diluted with an equal volume of 0.2% sulfuric acid solution. These samples were then heated to 75° C. and thereafter allowed to cool to room temperature. The odor of the untreated sample upon cooling invariably was strong and disagreeable, while the odor of the sample deodorized according to the method of this invention was very slight and hardly distinguishable. This organoleptic difference is distinguishable by persons not familiar with glycerin as well as by those skilled in the art of glycerin manufacture.

Although the foregoing has been chiefly related to the deodorization of C. P. glycerin, a very marked improvement is also noted when lower grade glycerins are subjected to steam deodorization in the presence of a volatile acid such as HCl; and therefore the invention is considered to include all grades of glycerin which are conventionally considered as commercial grade, such as C. P. glycerin, U. S. P. glycerin, dynamite glycerin, and the like.

The glycerin obtained according to the method of deodorization as set forth herein may be used for more purposes than has ever been possible in the past with distilled glycerin derived from saponification processes. As was pointed out previously, this deodorized product is of exceptional value in processes wherein the pH of the material with which the glycerin is maintained in contact is substantially below the 6.0 which is typical for a mixture of distilled glycerin and distilled water. These processes include among others the manufacture of food products, beverages, coatings for food products, cosmetics, and toilet articles.

The term "steam deodorizing" as referred to in the specification and appended claims, is well recognized in the art. By the use of the term in the appended claims is meant the passage of steam through a mixture under subatmospheric pressures.

Obviously, many modifications and variations of the invention as hereinbefore set forth, may be made without departing from the spirit and scope thereof, and therefore only such limitations should be imposed as are indicated in the appended claims.

We claim:

1. A method for removing odor-forming constituents from substantially pure distilled glycerin derived from saponification processes and containing non-volatile odor-forming constituents which comprises adding a small amount of a volatile acid to the said distilled glycerin and steam deodorizing under subatmospheric pressures the mixture so formed to volatilize and remove said odor-forming constituents.

2. A method for removing odor-forming constituents from substantially pure distilled glycerin derived from saponification processes and containing non-volatile odor-forming constituents which comprises adding to the said distilled glycerin a small amount of a volatile acid and steam deodorizing the mixture so formed under subatmospheric pressure for a period of at least three hours to volatilize and remove said odor-forming constituents.

3. A method as in claim 2 wherein the volatile acid is hydrochloric acid.

4. A method for removing odor-forming constituents from substantially pure distilled glycerin derived from saponification processes and containing non-volatile odor-forming constituents which comprises adding to the said distilled glycerin a small amount of hydrochloric acid, less than 0.5% by weight, and steam deodorizing the mixture so formed under subatmospheric pressure for a period of at least three hours.

5. A method for removing odor-forming constituents from substantially pure distilled glycerin derived from saponification processes and containing non-volatile odor-forming constituents which comprises steam deodorizing said distilled glycerin under subatmospheric pressures in the presence of a small amount of a volatile acid whereby said odor-forming constituents are volatilized and removed from the glycerin.

6. A method for removing odor-forming constituents from substantially pure distilled glycerin derived from saponification processes and containing non-volatile odor-forming constituents which comprises steam deodorizing said distilled glycerin under subatmospheric pressure in the presence of a small amount of a volatile acid at temperatures ranging from about 65° C. to about 93° C. for about two hours to volatilize and remove said odor-forming constituents, and thereafter continuing the steam deodorization at a substantially higher temperature until the last traces of said volatile acid are removed from the glycerin.

7. A method for removing odor-forming constituents from substantially pure distilled glycerin derived from saponification processes and containing non-volatile odor-forming constituents which comprises adding to said distilled glycerin a small amount of a volatile acid, steam deodorizing the mixture so formed under subatmospheric pressure and at a temperature in the range of about 65° C. to 93° C. for about two hours to volatilize and remove said odor-forming constituents, and thereafter continuing the steam deodorization for about one hour more at a substantially higher temperature to volatilize off the last traces of said volatile acid from the glycerin.

8. A method for removing odor-forming constituents from substantially pure distilled glycerin derived from saponification processes and containing non-volatile odor-forming constituents which comprises steam deodorizing said distilled glycerin under subatmospheric pressure in the presence of a small amount of a volatile acid at temperatures ranging from about 65° C. to about 93° C. for about two hours to volatilize and remove said odor-forming constituents, and thereafter continuing the steam deodorization for about one hour more at a temperature of about 164° C. to volatilize off the last trace of said volatile acid from the glycerin.

LYLE J. LOFDAHL.
JAMES K. GUNTHER.

REFERENCES CITED

The following references are of record in the file of this patent:

UNITED STATES PATENTS

| Number | Name | Date |
|---|---|---|
| 242,272 | Clolus | May 31, 1881 |
| 263,915 | Kessler | Sept. 5, 1882 |
| 420,830 | Porter | Feb. 4, 1890 |
| 522,133 | Van Ruymbeke | June 26, 1894 |
| 654,023 | Ruch | July 17, 1900 |
| 1,936,497 | Carothers et al. | Nov. 21, 1933 |
| 2,120,227 | Brant | June 14, 1938 |
| 2,295,618 | Wulff et al. | Sept. 15, 1942 |